United States Patent
Kumta et al.

(10) Patent No.: US 11,728,543 B2
(45) Date of Patent: Aug. 15, 2023

(54) ELECTROSPINNING OF PVDF-HFP: NOVEL COMPOSITE POLYMER ELECTROLYTES (CPES) WITH ENHANCED IONIC CONDUCTIVITIES FOR LITHIUM-SULFUR BATTERIES

(71) Applicant: UNIVERSITY OF PITTSBURGH—OF THE COMMONWEALTH SYSTEM OF HIGHER EDUCATION, Pittsburgh, PA (US)

(72) Inventors: Prashant N. Kumta, Pittsburgh, PA (US); Bharat Gattu, Pittsburgh, PA (US); Moni Kanchan Datta, Pittsburgh, PA (US); Oleg Velikokhatnyi, Pittsburgh, PA (US); Pavithra Murugavel Shanthi, Pittsburgh, PA (US); Prashanth Jampani Hanumantha, Pittsburgh, PA (US)

(73) Assignee: UNIVERSITY OF PITTSBURGH—OF THE COMMONWEALTH SYSTEM OF HIGHER EDUCATION, Pittsburgh, PA (US)

(*) Notice: Subject to any disclaimer, the term of this patent is extended or adjusted under 35 U.S.C. 154(b) by 491 days.

(21) Appl. No.: 16/628,837

(22) PCT Filed: Jul. 9, 2018

(86) PCT No.: PCT/US2018/041196
§ 371 (c)(1),
(2) Date: Jan. 6, 2020

(87) PCT Pub. No.: WO2019/010474
PCT Pub. Date: Jan. 10, 2019

(65) Prior Publication Data
US 2020/0136113 A1    Apr. 30, 2020

Related U.S. Application Data

(60) Provisional application No. 62/529,638, filed on Jul. 7, 2017.

(51) Int. Cl.
*H01M 50/44* (2021.01)
*D01D 5/00* (2006.01)
(Continued)

(52) U.S. Cl.
CPC ............ *H01M 50/44* (2021.01); *D01D 5/003* (2013.01); *D01F 1/10* (2013.01); *H01M 10/052* (2013.01);
(Continued)

(58) Field of Classification Search
CPC ....... H01M 10/056; H01M 2300/0088; H01M 2300/0091; H01M 2300/0094;
(Continued)

(56) References Cited

U.S. PATENT DOCUMENTS 7,279,251 B1 * 10/2007 Yun ..................... H01M 10/052
429/129
2012/0052362 A1 * 3/2012 Thurman ................ B32B 27/32
442/381
(Continued)

FOREIGN PATENT DOCUMENTS

WO    WO 01/89023       * 11/2001 ........ H01M 10/0431
WO    2017036522 A1    3/2017

OTHER PUBLICATIONS

Liao et al., Polypropylene-supported and nano-Al2O3 doped poly-(ethylene oxide)-poly(vinylidene fluoride-hexafluoropropylene)-based gel electrolyte for lithium ion batteries, Journal of Power Sources (Feb. 15, 2011), 196(4):2115-2121. Abstract.
(Continued)

*Primary Examiner* — Jeremiah R Smith
(74) *Attorney, Agent, or Firm* — Carol A. Marmo; Eckert Seamans Cherin & Mellott, LLC

(57) ABSTRACT

The invention relates to lithium ion batteries and, more particularly, to lithium ion conducting composite polymer electrolyte separators. The separators include a nanofiber mat composed of electrospun nanofibers. The nanofibers include a polymer having one or more polar halogen groups, a lithium-containing solid or liquid electrolyte and nanoparticle filler. The polymer, electrolyte and filler are combined
(Continued)

to form a solution that is subjected to the electro-spinning process to produce electrospun nanofibers in the form of the mat.

11 Claims, 12 Drawing Sheets

(51) Int. Cl.
| | |
|---|---|
| *D01F 1/10* | (2006.01) |
| *H01M 10/052* | (2010.01) |
| *H01M 10/0565* | (2010.01) |
| *H01M 50/403* | (2021.01) |
| *H01M 50/431* | (2021.01) |
| *H01M 50/489* | (2021.01) |
| *H01M 50/426* | (2021.01) |
| *H01M 50/434* | (2021.01) |
| *H01M 50/497* | (2021.01) |
| *H01M 50/40* | (2021.01) |
| *H01M 10/0525* | (2010.01) |

(52) U.S. Cl.
CPC ....... *H01M 10/0565* (2013.01); *H01M 50/40* (2021.01); *H01M 50/403* (2021.01); *H01M 50/426* (2021.01); *H01M 50/431* (2021.01); *H01M 50/434* (2021.01); *H01M 50/489* (2021.01); *H01M 50/497* (2021.01); *H01M 10/0525* (2013.01); *H01M 2300/0082* (2013.01); *H01M 2300/0094* (2013.01)

(58) Field of Classification Search
CPC ............. H01M 50/44; H01M 10/0565; H01M 50/403; H01M 10/0525
See application file for complete search history.

(56) References Cited

U.S. PATENT DOCUMENTS

| | | | |
|---|---|---|---|
| 2013/0280642 A1 | 10/2013 | Gummalla et al. | |
| 2015/0099185 A1* | 4/2015 | Joo | H01M 10/0525 429/231.95 |
| 2015/0372273 A1* | 12/2015 | Lee | H01M 50/411 429/144 |
| 2016/0322621 A1* | 11/2016 | Umeyama | H01M 50/449 |
| 2016/0344035 A1 | 11/2016 | Zhamu et al. | |
| 2016/0365557 A1* | 12/2016 | Rao | H01M 50/403 |
| 2017/0117542 A1* | 4/2017 | Park | H01M 4/386 |
| 2018/0233773 A1* | 8/2018 | Teranishi | H01M 10/056 |
| 2018/0266003 A1* | 9/2018 | Brousse | H01G 11/62 |

OTHER PUBLICATIONS

Raghavan et al., Novel electrospun poly(vinylidene fluoride-co-hexafluoropropylene)-in situ SiO2 composite membrane-based polymer electrolyte for lithium batteries, Journal of Power Sources (2008), 184(2):437-443. Abstract.

Sethupathy et al.. Preparation of PVDF/SiO2 Composite Nanofiber Membrane Using Electrospinning for Polymer Electrolyte Analysis, Soft Nanoscience Letters (2013), 3:37-43.

Solarajan et al., High performance electrospun PVdF-HFP/SiO2 nanocomposite membrane electrolyte for Li-ion capacitors, J. Appl. Polym. Sci. (Apr. 16, 2017), 134(32):1-15.

Zaccaria et al., Effect of Oxide Nanoparticles on Thermal and Mechanical Properties of Electrospun Separators for Lithium-Ion Batteries, Journal of Nanomaterials (Oct. 1, 2012), 2012:pp. 1-8.

International Search Report and Written Opinion for PCT/US2018/041196, dated Oct. 2, 2018.

* cited by examiner

ELECTROSPINNING OF PVDF-HFP: NOVEL COMPOSITE POLYMER ELECTROLYTES (CPES) WITH ENHANCED IONIC CONDUCTIVITIES FOR LITHIUM-SULFUR BATTERIES

CROSS-REFERENCE TO RELATED APPLICATIONS

This application is a U.S. National Stage Application under 35 U.S.C. § 371 of International Patent Application No. PCT/US2018/041196, filed on Jul. 9, 2018, entitled "ELECTROSPINNING OF PVDF-HFP: NOVEL COMPOSITE POLYMER ELECTROLYTES (CPES) WITH ENHANCED IONIC CONDUCTIVITIES FOR LITHIUM-SULFUR BATTERIES", which claims priority under 35 U.S.C. § 119(e) to U.S. Provisional Patent Application Ser. No. 62/529,638, filed Jul. 7, 2017, entitled "ELECTROSPINNING OF PVDF-HFP: NOVEL COMPOSITE POLYMER ELECTROLYTES (CPES) WITH ENHANCED IONIC CONDUCTIVITIES FOR LITHIUM-SULFUR BATTERIES", which are herein incorporated by reference.

GOVERNMENT SUPPORT

This invention was made with government support under CBET11511390 awarded by the National Science Foundation (NSF) and DE-EE0006825 awarded by the Department of Energy (DOE). The government has certain rights in the invention.

FIELD OF THE INVENTION

The invention relates to novel lithium ion conducting composite polymer electrolyte separators (CPEs), and host matrices for preparing the CPEs that incorporate poly (vinylidene fluoride-co-hexafluoro propylene) (PVdF-HFP) prepared by electrospinning.

BACKGROUND OF THE INVENTION

During the last two decades, there has been unprecedented development in lithium-ion battery technology due to the increased demand for ever-increasing portable electronic devices and hybrid electric vehicles. Portable electronic devices, mobile cellular phones and person digital assistants (PDAs) use secondary lithium-ion batteries (LIBs), which are not economical for large scale plug-in hybrid applications. In addition, there is increased concern associated with the safety of LIBs that has drawn the attention of researchers towards the development of high energy density, leak-free and flexible lithium polymer batteries with improved safety.

Though the field of LIBs has made tremendous progress, transition metal oxide and phosphate-based cathodes typically used in these systems have maintained a maximum theoretical capacity of ~200-300 mAh/g. This energy limitation, along with high cost and ecological concerns associated with these materials continues to restrict their application in large-scale devices.

Lithium-sulfur battery (Li—S) technology has been considered and investigated as an alternative for current LIBs due to the superior theoretical capacity (1674 mAh/g), and specific energy density (2600 Wh/kg) of elemental sulfur in comparison with conventional cathode materials. In addition, the low cost, abundance, and environmentally friendly property of sulfur makes it a promising candidate as cathode material for large scale energy storage applications. However, lithium-sulfur batteries suffer from inefficient utilization of the active material due to the insulating nature of elemental sulfur. The lithium polysulfides formed during the electrochemical cycling of sulfur are also highly soluble in organic liquid electrolytes leading to loss of active material which in turn results in poor cyclability and utilization.

Improved active material utilization can be achieved by embedding the sulfur into a conducting carbonaceous or polymeric matrix forming composites. This technique provides a conducting network for sulfur, hence improving the conductivity of the composite. Other approaches to improve the capacity of Li—S batteries involve the use of chemical interactions of polysulfides with transition metal oxides and trapping of sulfur into porous structures to prevent them from dissolving into the electrolyte. Though these approaches can increase the active material utilization of sulfur cathodes, they do not completely prevent the polysulfide from dissolving into the electrolyte.

Another approach to reduce the dissolution of sulfur is to modify the electrolyte by replacing it with an ionic liquid electrolyte or a polymer electrolyte. Among these approaches to modify the electrolyte, replacing liquid organic liquid electrolytes with polymeric electrolytes is also promising and proven to be effective. In general, a polymeric electrolyte may be defined as a membrane with transport properties like that of liquid ionic electrolytes. Polymer electrolytes, originally developed for lithium ion battery system, may be modified for application in lithium sulfur batteries. All the polymer systems can be conveniently grouped into two broad categories comprising essentially solid polymer electrolyte (SPE) and gel polymer electrolyte (GPE).

Solid polymer electrolytes (SPEs) are composed of a lithium salt (e.g., $LiPF_6$, $LiCF_3SO_3$, and $LiC(CF_3SO_2)_3$) dissolved in high molecular weight polymers such as polyethylene oxide (PEO) or polypropylene oxide (PPO), with the polymer acting as a solid solvent. SPEs conduct ions through local segment motion of polymer resulting in poor ionic conductivities. The second class of polymer electrolyte, GPE is obtained by incorporating liquid electrolyte into a polymer matrix that forms a stable gel polymeric host, resulting in high ionic conductivities. The advantages of GPE over liquid electrolyte include no internal short-circuiting and electrolyte leakage. The prerequisites of GPEs for lithium-sulfur batteries includes high ionic conductivity at ambient and non-ambient temperatures, high transference number, good mechanical strength, thermal and electrochemical stability and compatibility with electrodes, in addition to their ability to act as a physical barrier that prevents the dissolution of polysulfide ions from the cathode and subsequent deposition at the anode.

Electrospinning is an efficient fabrication process that yields porous and fibrous membranes with average diameters ranging from 100 nm to 5 µm, which are at least one or two orders of magnitude smaller than the fibers produced from other fiber fabrication processes, such as melt and solution spinning. Electrospinning technology has recently been extended to various fields such as preparation of porous filters, biomedical materials, reinforcing components, cloths for electromagnetic wave shielding, sensors, electronic devices, etc. Electrospun mats of conventional polymer composites have been used as electrolytes for lithium-ion batteries. These electrospun polymer electrolytes show superior mechanical and ionic properties due to their unique fibrous structure. However, the use of electrospun polymer membranes as electrolytes for lithium sulfur batteries is not known in the art.

Thus, there is a need in the art to develop electrospun polymer membranes for use as host matrices for preparing CPEs for use in lithium-sulfur batteries.

SUMMARY OF THE INVENTION

In one aspect, the invention provides a lithium ion conducting composite polymer electrolyte separator that includes a nanofiber mat including electrospun nanofibers, which include a polymer having one or more polar halogen groups, a lithium-containing solid or liquid electrolyte, and nanoparticle filler.

The polymer can include poly(vinylidene fluoride-co-hexafluoro propylene). The electrolyte can include bis(trifluoromethane)sulfonimide lithium salt. In certain embodiments, the electrolyte includes an element selected from the group consisting of magnesium, sodium and mixtures and combinations thereof. The nanoparticle filler may include nanoparticles selected from transition metal, metal oxide and metal non-oxide selected from Group III, Group IV and Group V of the Periodic Table. The metal oxide may be selected from the group consisting of $SiO_2$, $Al_2O_3$, $B_2O_3$, fumed $SiO_2$, $TiO_2$, $V_2O_5$, and mixtures and combinations thereof. The metal non-oxide may be selected from the group consisting of nitride, carbide, boride, sulfide, selenide, telluride, phosphide, antimonide, arsenide, bismuthide, and mixtures and combinations thereof. The nanoparticle filler can include a dopant, wherein the doped nanoparticle filler may be selected from the group consisting of $Al_2O_3$, $B_2O_3$, $GeO_2$, $SnO_2$, $Bi_2O_3$, $Sb_2O_3$ and mixtures thereof.

In certain embodiments, the composite is a membrane.

The nanofiber mat can include multiple layers of the electrospun nanofibers. The electrospun nanofibers may have a diameter from 1-5 μm.

In another aspect, the invention provides a method of preparing a lithium ion conducting composite polymer electrolyte separator. The method includes preparing a solution, which includes a polymer having one or more polar halogen groups, a lithium-containing solid or liquid electrolyte, and nanoparticle filler; electrospinning the solution; forming electrospun nanofibers; forming a nanofiber mat; and activating the nanofiber mat.

In certain embodiments, the activating step includes soaking the nanofiber mat in an activation solution. The activation solution may include a liquid electrolyte.

BRIEF DESCRIPTION OF DRAWINGS

A full understanding of the disclosed concept can be gained from the following description of the preferred embodiments when read in conjunction with the accompanying drawings.

DETAILED DESCRIPTION OF THE INVENTION

Figure 1:
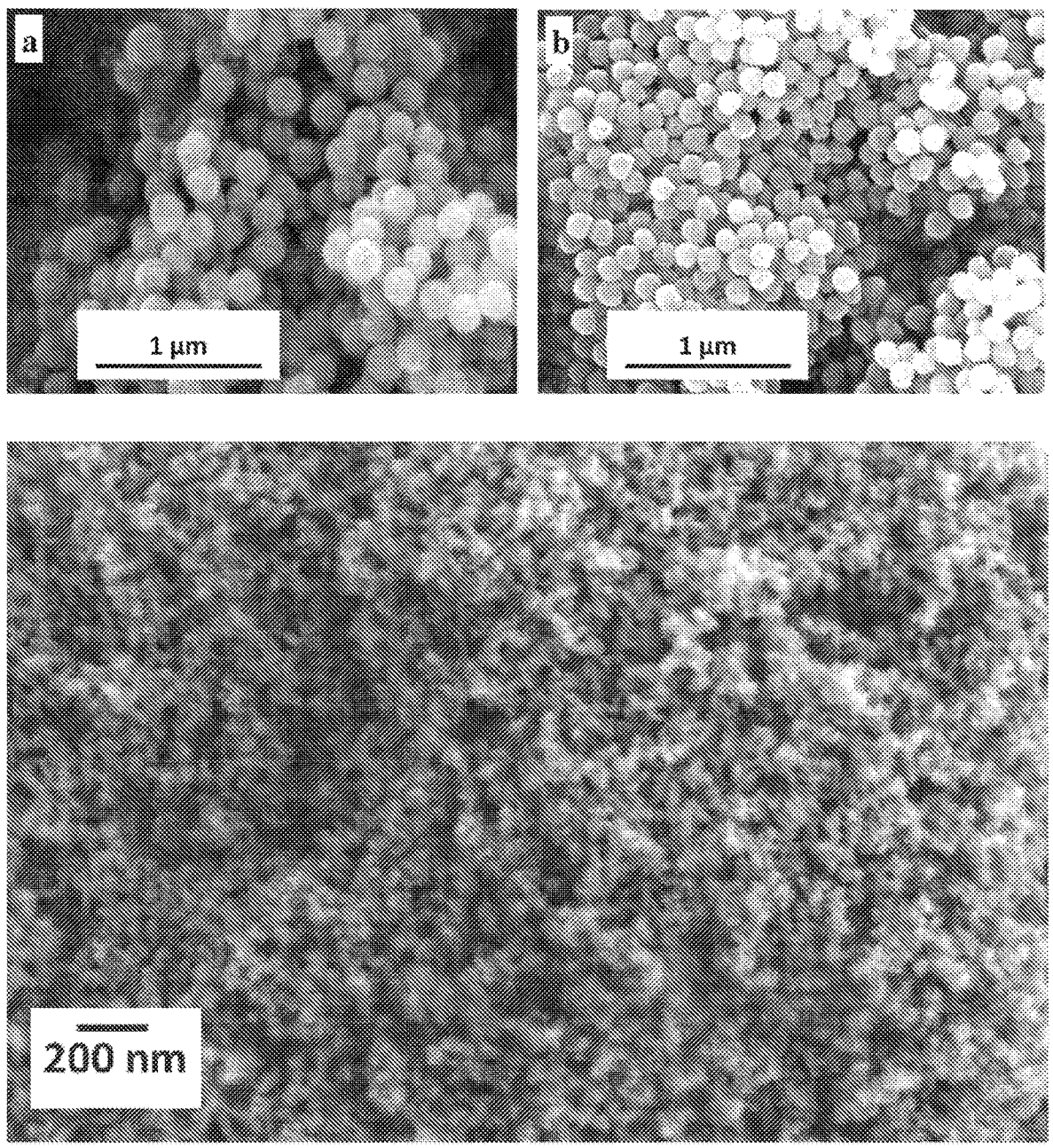
FIG. 1 includes SEM images showing the morphology of a) nm-$SiO_2$ and b) nm-$TiO_2$ and c) f-$SiO_2$, in accordance with certain embodiments of the invention.

The invention relates to novel lithium ion conducting composite polymer electrolyte separators (CPEs). Further, the invention relates to electrospun poly (vinylidene fluoride-co-hexafluoro propylene) (PVdF-HFP), and the incorporation of PVdF-HFP into host matrices for use in preparing the CPEs. In addition to PVdF-HFP, the electrospun host matrices also include bis(trifluoromethane)sulfonimide lithium salt (LiTFSI), e.g., about 10 wt. %, and particles of nanoparticle silica (nm-$SiO_2$), nanoparticle titania (nm-$TiO_2$) and fumed silica (f-$SiO_2$), e.g., about 10 wt. %.

The CPEs of the present invention provide improved properties and characteristics as compared to separators known in the art, such as but not limited to, liquid lithium electrolyte-based separators. For example, the inventive CPEs provide very high lithium ion conductivity, superior flame resistance, mechanically robust membranes with superior yield strength, and very low fade rate during electrochemical cycling due to the preclusion of polysulfide dissolution in a lithium-sulfur battery.

Without intending to be bound by any particular theory, it is believed that the interconnected morphological features of PVdF-HFP occurring as a result of the electrospinning process result in higher lithium ion conductivity, effective lithium ion transport and good interfacial characteristics with a lithium electrode. Higher ionic conductivity and liquid electrolyte up-take (e.g., greater than 250%) with enhanced dimensional stability, lower interfacial resistance and higher electrochemical stability are demonstrated with the CPEs in accordance with the invention.

For ease of description, the invention is described herein with respect to these particular materials. However, it is contemplated and understood that the invention is not limited only to the use of these particular materials. For example, the polymer system or composite is not limited to PVdF-HFP and can include any similar polymer system or composite containing polymer having one or more polar halogen groups. The polymer electrolyte separator of the invention can include any lithium-containing solid or liquid electrolyte, such as but not limited to LiTFSI. Similar electrolytes containing magnesium/sodium suitable for magnesium and sodium ion conduction can be incorporated in the CPEs for reversible magnesium and sodium battery applications. Thus, in certain embodiments, the polymer electrolyte separator includes an element selected from magnesium, sodium, and mixtures and combinations thereof. Further, the invention includes nanoparticle filler that may be selected from nano-meter sized particles of various transition metals, as well as metal oxides and metal non-oxides. In certain embodiments, the nanoparticle filler can constitute from 10 to 20 percent by weight. The transition metals, metal oxides and metal non-oxides may be selected from Group III, Group IV, and Group V of the Periodic Table. The metal oxides include, but are not limited to $SiO_2$, $Al_2O_3$, $B_2O_3$, $TiO_2$, $V_2O_5$, fumed $SiO_2$, and mixtures and combinations thereof. The nanoparticle filler may be doped with a dopant. The doped compositions can include $Al_2O_3$, $B_2O_3$, $GeO_2$, $SnO_2$, $Bi_2O_3$, $Sb_2O_3$, and combinations and mixtures thereof. Additionally, nano-sized metal non-oxide particles including nitrides, carbides, borides, sulfides, selenides, tellurides, phosphides, antimonides, arsenides, bismuthides and mixtures thereof may also be incorporated.

According to the certain embodiments of the invention, there are prepared composites of PVdF-HFP incorporating 10 wt. % LiTFSI and 10 wt. % particles of nanoparticle silica (nm-$SiO_2$), nanoparticle titania (nm-$TiO_2$) and fumed silica (f-$SiO_2$) by electrospinning. These electrospun composites, e.g., membranes, may be activated with lithium sulfur battery electrolyte of 50/50 vol. % dioxolane/dimethoxyethane with 1 M LiTFSI and 0.1 M $LiNO_3$.

The electrospun membranes consist of layers of fibers. In certain embodiments, the membranes include multiple layers of electrospun nanofibers in the form of a nanofiber mat. The diameter of the fibers can vary and in certain embodiments, the average fiber diameter is 1-5 µm or 2-5 µm or 1-2 µm. CPEs with f-$SiO_2$ exhibit higher ionic conductivity (e.g., with a maximum of $1.3 \times 10^{-3}$ S cm$^{-1}$ at 25° C. obtained with 10 wt. % filler composition). An optimum CPE based on PVdF-HFP with 10 wt. % f-$SiO_2$ exhibits enhanced charge-discharge performance in Li—S cells at room temperature (e.g., delivering initial specific capacity of 895 mAh g$^{-1}$ at 0.1 C-rate). The CPEs exhibit very stable cycling behavior at well over 100 cycles (fade rate ~0.056%/cycle), demonstrating their suitability for Li—S battery applications. In addition, the interconnected morphological features of PVdF-HFP results in superior mechanical properties (e.g., 200-350% higher tensile strength) and interfacial characteristics reflected as a stabilization of lithium metal anodes in symmetric lithium-metal cells (e.g., stable coulombic efficiency of 99.88% observed over 80 cycles during plating deplating of 12 mAh/cm$^2$ lithium at 3 mA/cm$^2$). Higher ionic conductivity, higher liquid electrolyte uptake (>250%) with dimensional stability, lower interfacial resistance and higher electrochemical stability are demonstrated by the CPEs. With these improved performance characteristics, PVdF-HFP is a suitable polymer electrolyte for high-performance Li—S rechargeable batteries.

The CPEs according to the invention may be prepared using conventional electrospinning apparatus and techniques. In certain embodiments, the PVdF-HFP and LiTFSI is dissolved in a solvent to form a homogeneous solution. This solution is dispersed with the nano-filler, e.g., nanoparticles, under sonication. The nano-filler, e.g., nano-particle filler, is prepared in accordance with conventional and other solution and solid state or vapor phase techniques that are known in the art (and described in more detail in the Examples section herein). The composite, e.g., membrane, is prepared by electrospinning of the solution by a conventional electrospinning method at room temperature. The resulting electrospun nanofibers are deposited on a collector, e.g., drum, and dried under vacuum. The nano-particle filler is embedded inside the nanofibers and dispersed on the fiber surface. For example, without intending to be bound by any particular theory, it is believed that the high surface area f-$SiO_2$ filler is advantageous in preventing polysulfide dissolution by forming an insulating film over the cathode. The nanofiber mat formed is heat pressed and activated by soaking in an activation solution, such as a liquid electrolyte (e.g., LiTFSI and $LiNO_3$ in dioxolane/dimethoxyethane). Following uptake of electrolyte, the activated nanofiber mats are then used as a separator-electrolyte complex in a Li—S battery.

EXAMPLES

PVdF-HFP-based CPEs (Composite Polymer Electrolytes) were prepared by a conventional electrospinning technique. Nano-particles, i.e., $SiO_2$(nm-$SiO_2$) and $TiO_2$ (nm-$TiO_2$) prepared using a conventional sol-gel-based nano-fabrication technique and commercially available fumed $SiO_2$(f-$SiO_2$), were used as fillers to improve the mechanical and ionic conducting properties of the CPEs. These nano-filler-incorporated PVdF-HFP composite polymer electrolytes were then tested as separator-electrolytes to improve the cycling stability of commercial sulfur cathodes in Li—S batteries.

1. Experiment
1.1 Materials

The polymer: poly(vinylidene fluoride-co-hexafluoropropylene) (PVdF-HFP) (Mw ~400,000, Aldrich), solvents: N, N-Dimethylformamide (DMF) (ACS reagent, ≥99.8%, Aldrich), acetone (ACS reagent, ≥99.5%, Aldrich) and lithium salt: bis(trifluoromethane)sulfonimide lithium salt (LiTFSI) (99.95% trace metals basis, Aldrich) were vacuum dried for 12 h at 60° C., and then used in an electrospinning process.

Commercially available fumed silica: f-$SiO_2$ (0.007 µm powder, Aldrich) was used without any treatment. Reagents for nm-$SiO_2$ and nm-$TiO_2$ nanoparticles synthesis: tetraethyl orthosilicate (TEOS) (99.99%, Aldrich), titanium(IV) isopropoxide (TTIP) (97%, Aldrich), ethanol (99.99%, Aldrich), 2-propanol (ACS reagent, ≥99.5%, Aldrich), hydrochloric acid (ACS reagent, 37%, Aldrich) and ammonium hydroxide (ACS reagent, 28.0-30.0% $NH_3$ basis, Aldrich) were used without any further purification. Milli-Q water (18.2Ω) was used throughout the experiment.

1.2 Preparation of PVdF-HFP Nanofiber Membrane

For preparation of the CPEs, PVdF-HFP (10 wt %) and LiTFSI (0.1 wt %) were dissolved in a mixed solvent of DMF/acetone (7:3, w/w) at 50° C. for 12 h until a homogeneous solution was formed. The resulting solution was dispersed with (0.1 w %) nano-filler (nm-$SiO_2$/nm-$TiO_2$/f-$SiO_2$) under sonication for 12 hrs. The CPEs were prepared by a conventional electrospinning method at room temperature. Electrospinning of the nano-filler dispersed solution was performed at a flow rate of 1 ml/h and a high voltage of 20 kV at room temperature, with 15 cm distance maintained between the tip of the syringe and rotating drum. The nanofibers deposited onto the rotating drum were collected, dried under vacuum for 12 h at 60° C. at 1 atm. The nanofiber mats were then heat pressed at 80° C. for 30 min at 1 atm and activated by soaking in 1.8 M LiTFSI and 1 M LiNO3 in 1:1 vol. % dioxolane/dimethoxy ethane for 30 min before use as a separator-electrolyte complex in Li—S battery.

1.3 Preparation of $SiO_2$ Nanoparticles $SiO_2$ nanoparticles were prepared by hydrolysis of TEOS in an ethanol medium in the presence of ammonium hydroxide. Initially, 3 ml of TEOS was mixed with 20 ml ethanol under sonication. Then, 20 ml ammonium hydroxide solution (28-30%) was added to this solution under sonication to promote the polymerization and condensation reaction. The white turbid solution of $SiO_2$ nanoparticles was centrifuged and dried under vacuum for 12 h. The $SiO_2$ nanoparticles were then heated at 700° C. for 4 h to remove any of the polymeric carbon residues.

1.4 Preparation of $TiO_2$ Nanoparticles $TiO_2$ nanoparticles were prepared by the hydrolysis of TTIP in propyl alcohol, wherein 0.5 ml TTIP was dissolved in 10 ml isopropyl alcohol, and then the solution was added drop-wise into 40 ml water containing 2.5 ml HCl under sonication. The colloidal solution formed by polymerization and condensation was then filtered and dried under vacuum for 12 hrs. The fine powders of $TiO_2$ obtained after drying were calcined at 800° C. for 3 h.

1.5 Materials Characterization and Electrochemical Measurements:

The nature of the nanoparticle fillers and the electrospun CPE membranes was evaluated with respect to cycling stability. The microstructure of the nanofillers and electrospun CPE membranes was assessed by conducting scanning electron microscopy (SEM) analysis on a Philips XL30 machine operating at 20 kV. The crystal structure of the synthesized nm-$TiO_2$, nm-$SiO_2$ and f-$SiO_2$ nanoparticles was characterized by X-ray diffraction using Philips XPERT PRO system employing CuKα ($\lambda$=0.15406 nm). The scans were recorded in 2θ range of 10°-90°, at a constant current of 40 mA and voltage of 45 kV. The nature of chemical bonding in the CPEs was analyzed by attenuated total reflectance Fourier transform infrared spectroscopy (ATR-FTIR, Nicolet 6700 spectrophotometer, Thermo Electron Corporation) using a diamond ATR Smart orbit. Spectra were obtained at 1 $cm^{-1}$ resolution averaging 64 scans in the 400-4000 $cm^{-1}$ frequency range. The surface chemistry of the CPEs was probed by X-ray photoelectron spectroscopy (XPS) using an ESCALAB 250 Xi system (Thermo Scientific) equipped with a monochromated Al Kα X-ray source. Beams of low-energy (≤10 eV) $Ar^+$ ions and low-energy electrons guided by magnetic lens were used to provide uniform charge neutralization. The standard analysis spot of 400×400 $\mu m^2$ was defined by the microfocused X-ray source. The measurements were performed at room temperature in an ultra-high vacuum (UHV) chamber with the base pressure <5*10-10 mBar (the charge neutralization device produced 2*$10^{-10}$ mBar partial pressure of Ar during measurements). The Advantage software package (Thermo Fisher Scientific) was used to fit the elemental spectra based on calibrated analyzer transmission functions, Scofield sensitivity factors, and effective attenuation lengths for photoelectrons from the standard TPP-2M (Tanuma Powell and Penn-2M) formalism. The mechanical properties of the CPEs were analyzed to explain the improved electrochemical performance of the CPEs. The stress-strain behavior of the polymer membranes was studied using Instron Universal Tensile Tester, Model 1123. The pore characteristics and specific surface area (SSA) of the nano filler samples were analyzed on a Micromeritics ASAP 2020 Physisorption analyzer, using the Brunauer-Emmett-Teller (BET) isotherm generated. The powders were first vacuum degassed and then tested for nitrogen adsorption and desorption for surface area analysis.

1.6 Electrochemical Characterization

Electrodes for battery half-cell characterization were prepared by casting a slurry of 70 wt. % commercial sulfur, 20 wt. % acetylene black and 10 wt. % PVdF in N-methyl pyrrolodine (NMP) onto aluminum foil followed by drying under vacuum for 24 hrs. A uniform electrode sulfur loading varying between 1.5 mg-2 mg cm/$cm^2$ was maintained for all the electrochemical measurements. Coin cells, i.e., 2025-type coin cells, were assembled in an Innovative, Inc. glove box (UHP Argon, <0.1 ppm $O_2$, $H_2O$) with sulfur-coated electrodes as the working electrode, lithium foil as the counter electrode, Celgard 2400 polypropylene (PP) as the separator, and 1.8 M LiTFSI (bis(trifluoromethane)sulfonamide lithium salt) in 1:1 vol. % 1, 3 dioxolane and 1, 2 dimethoxyethane with 0.1 M $LiNO_3$ as the electrolyte. The electrochemical cycling behavior of the cells thus prepared was studied by cycling between 1.7-2.6 V (wrt Li+/Li) at 0.1 C (~162 mA/g) current rate using an Arbin BT200 battery testing system. Ion conductivity of GPEs was studied by AC impedance spectroscopy in Gamry Potentiostat. Polymer membranes were secured between two steel disks and studied at a high frequency range (10-100 kHz) at 10 mA amplitude. Equivalent circuit modeling was performed using Z-view 2.0 (Scribner Associates Inc.) to obtain the CPE ionic conductivity values.

The superior mechanical strength of the CPE electrodes was also shown to be effective in improving the coulombic efficiency of lithium metal anodes by testing in lithium symmetric cells consisting of two electrodes of 22 mg of lithium (1 $cm^2$ area) assembled with the optimal CPE (f-$SiO_2$) as the separator. Lithium was plated and deplated from the working electrode at a rate of 3 mA/$cm^2$ for 4 hours (12 mAh/$cm^2$) and overpotential of plating/deplating was studied to provide an estimate of promising stabilization of lithium metal anodes afforded by the CPEs. Control experiments involved the use of liquid electrolyte soaked Celgard membrane as the separator.

2. Results and Discussion 2.1. SEM Analysis of Nanofiller Particles

FIG. 1 shows the morphology of nm-$SiO_2$, nm-$TiO_2$ and f-$SiO_2$ nanoparticles studied using Scanning Electron Microscopy (SEM). The nm-$SiO_2$ and nm-$TiO_2$ (FIG. 1a,b) were observed to be spherical with a uniform particle size distribution. The nm-$SiO_2$ nanoparticles had an average particle diameter of ~200 nm which was further confirmed by a Dynamic Light Scattering (DLS) technique. The nm-$TiO_2$ particles were almost spherical shaped with ~150 nm diameter. The SEM of f-$SiO_2$ was performed at a higher magnification and showed agglomerates of nano-meter sized individual particles. This confirms the extremely small (~7 nm) particle size of f-$SiO_2$ mentioned in the product specification (Sigma Aldrich, Inc.). The XRD patterns obtained from both nm-$SiO_2$ and f-$SiO_2$ showed patterns that corresponded to amorphous structures, indicating the amorphous nature of both the $SiO_2$ samples. However, the XRD pattern of $TiO_2$ showed crystalline peaks corresponding to rutile structure.

2.2. Surface Area Analysis

The specific surface area of the nanofillers is a factor in determining the electrochemical performance of the CPEs. It has been observed that smaller size particles for a similar volume fraction of the ceramic filler phase impart an improved performance as compared to larger size particles because of their ability to cover more surface area. BET surface area analyses of the nanofillers are presented in Table 1.

TABLE 1

BET surface area analysis of nm-$SiO_2$, nm-$TiO_2$ and f-$SiO_2$

| Sample | BET Surface Area ($m^2/g$) | Langmuir Surface Area/ ($m^2/g$) | Total Pore Volume ($cm^3/g$) | Adsorption average pore width (nm) |
|---|---|---|---|---|
| f-$SiO_2$ | 191.61 | 329.19 | 0.42 | 8.72 |
| nm-$SiO_2$ | 18.03 | 22.36 | 0.21 | 7.96 |
| nm-$TiO_2$ | 6.47 | 10.18 | 0.17 | 10.90 |
| Celgard 2400 | 46.42 | 52.62 | 0.12 | 24.64 |
| PVdF-HFP + f-$SiO_2$ | 217.20 | 342.5 | 0.53 | 14.42 |
| PVdF-HFP + nm-$SiO_2$ | 99.04 | 100.02 | 0.25 | 15.2 |
| PVdF-HFP + nm-$TiO_2$ | 72.6 | 86.5 | 0.21 | 12.2 |

The BET surface area results indicated that f-$SiO_2$ had a high BET surface area of 191.61 $m^2/g$ which was closer to the value (175-225 $m^2/g$) from the product specifications. The f-$SiO_2$ also exhibited a high pore volume of 0.417 $cm^3/g$. In contrast, the nm-$SiO_2$ and nm-$TiO_2$ showed lower surface areas of 18.03 and 6.47 $m^2/g$, respectively. The very high surface area of f-$SiO_2$ is expected to improve the performance of CPEs as compared to other fillers. Table 1 also shows the surface areas and porosities of nm-$SiO_2$, f-$SiO_2$ and nm-$TiO_2$ incorporated PVDF-HFP hybrid membranes. For comparison, the porosity of a commercial polypropylene (PP) membrane separator (Celgard 2400) is also shown. The BET surface area of this polypropylene membrane was 46.42 $m^2/g$, comparable to the values reported in literature. It is seen that the porosities of the hybrid membranes are significantly greater than that of the microporous PP membrane. The PVDF-HFP nanofibers formed free-standing nonwoven membranes that have relatively high porosities. The introduction of nm-$SiO_2$ and nm-$TiO_2$ nanoparticles further increased the porosity values due to the extra surface area of nanoparticles. However, owing to the very high surface area of f-$SiO_2$, the BET surface area of f-$SiO_2$ incorporated PVDF-HFP membrane was found to 217.2 $m^2/g$, about twice that of the other nanofiller counterparts.

2.3 SEM Analysis of the Nanofibers

Figure 2:
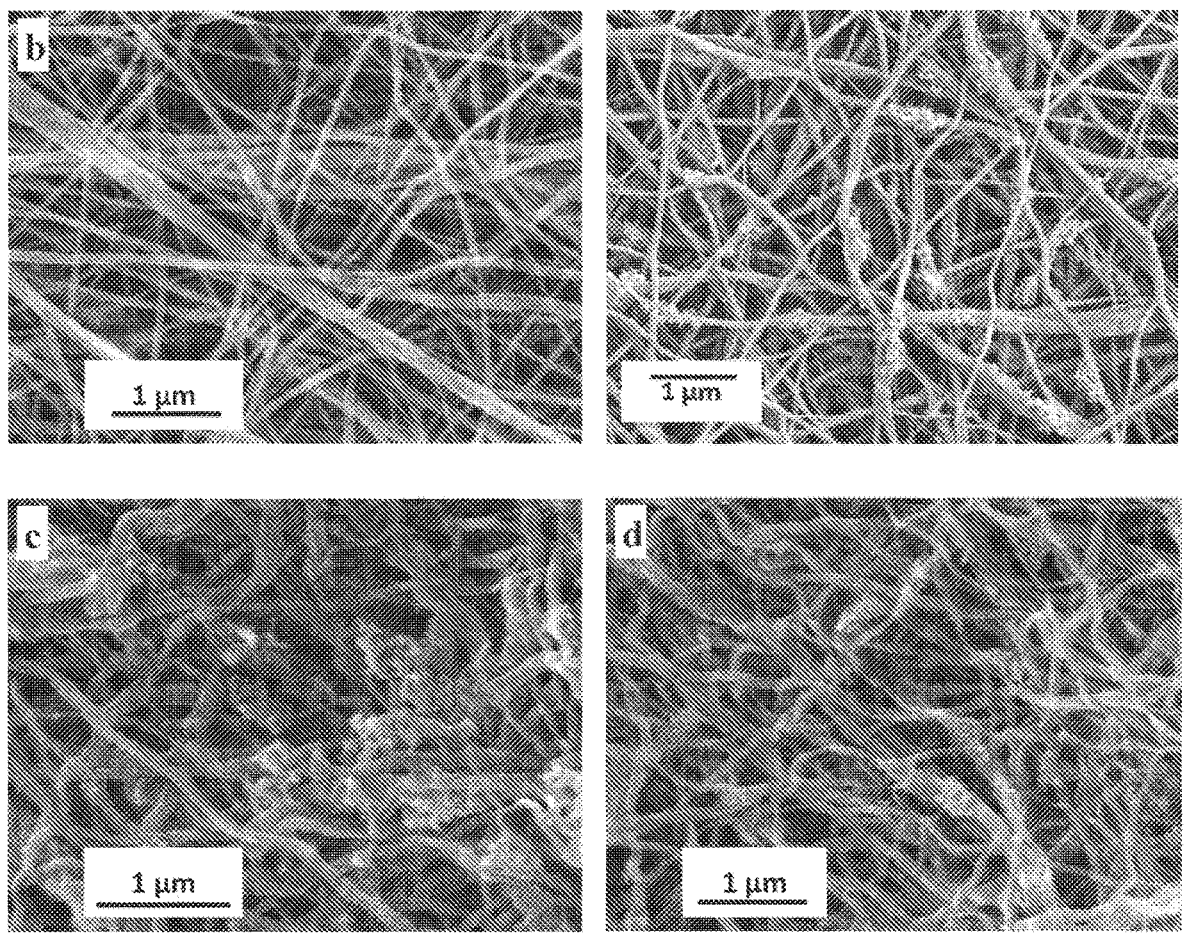
FIG. 2 includes SEM images showing a) electro spun PVdF-HFP polymer membranes with dissolved LiTFSI, b) electro spun PVdF-HFP with dissolved LiTFSI (10 wt. %) and dispersed f-$SiO_2$ (10 wt. %), c) electro spun PVdF-HFP with dissolved LiTFSI (10 wt. %) and dispersed nm-$SiO_2$ (10 wt. %), and d) electrospun PVdF-HFP with dissolved LiTFSI (10 wt. %) and dispersed nm-$TiO_2$ (10 wt. %), in accordance with certain embodiments of the invention.
Figure 3:
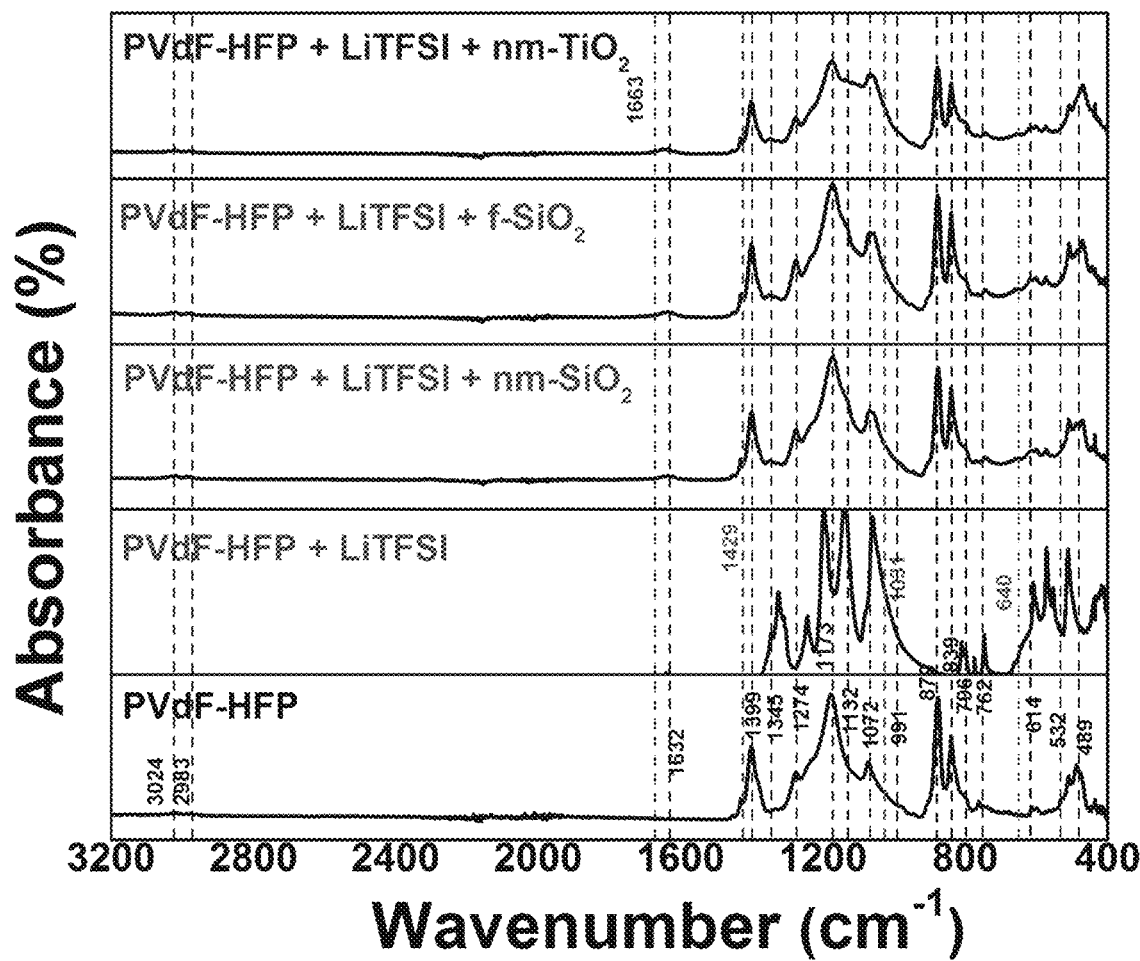
FIG. 3 includes FTIR spectra showing pure PVDF-HFP, PVDF-HFP with 10 wt. % LiTFSI and various nanofillers (10 wt. %), in accordance with certain embodiments of the invention.

For effective battery separator applications, electrospun polymer mats are usually required to be of uniform fiber thickness with a bubble-free morphology. Formation of bubble-like structures typically results in non-uniform pore distribution in the mats and a decrease in nanofiller exposure to the surface. To assess the morphological characteristics of the membranes, the electrospun polymer mats were analyzed using SEM technique. The SEM micrographs of PVDF-HFP membranes with 10 wt. % dissolved LiTFSI (FIG. 2a) showed an inter-penetrated fibrous network potentially resulting in improved mechanical strength in the CPEs. The membranes also exhibited a uniform and bead-free morphology with fibers of ~175 nm diameter. SEM images of PVdF-HFP+LiTFSI membranes with dispersed 10 wt. % f-$SiO_2$, nm-$SiO_2$ and nm-$TiO_2$ (FIG. 2b-d) indicated that the introduction of nanofillers did not change the morphology of the electrospun PVDF nanofibers. However, the nanoparticles were both embedded inside the nanofibers and dispersed on fiber surface, which was clearly observed in the SEM EDS mapping of the filler incorporated polymer mats. The surface roughness increased upon introduction of nanofillers, while the average diameter of nanofibers was largely unaffected. The exposure of nm-$TiO_2$, nm-$SiO_2$ and f-$SiO_2$ nanofillers on fiber surfaces allowed them to increase accessible surface area and form extensive Lewis acid/base interactions with the ionic species in the liquid electrolyte possibly resulting in higher ionic conductivities.

2.4 FTIR Analysis

Any change in the chemical nature of PVdF-HFP membranes upon addition of LiTFSI salt and nanofillers (f-$SiO_2$, nm-$SiO_2$ and nm-$TiO_2$) was evaluated with respect to chemical stability of the CPEs during electrochemical cycling. The nature of chemical bonding in PVdF-HFP and LiTFSI was analyzed using FTIR spectroscopy for comparison with LiTFSI incorporated polymer membranes. PVdF-HFP being a semi-crystalline polymer, the FTIR spectra of pure PVdF-HFP contained some crystalline (α-phase) and amorphous (β-phase) phase related peaks. The bands of pure polymer PVdF-HFP due to the crystalline phase (α-phase) were observed at 489, 532, 614, 762, 796 and 976 $cm^{-1}$, and the bands related to the amorphous phase (3-phase) were observed at 839 $cm^{-1}$ and 879 $cm^{-1}$.

The addition of LiTFSI to the PVdF-HFP membranes introduced three distinct peaks at 1058, 1630 and 574 $cm^{-1}$ in the FTIR spectrum, in addition to the peaks corresponding to PVDF-HFP polymer. These observations exactly overlap prior art findings on FTIR analysis of the interaction of LiTFSI with PVdF-HFP according to which the peaks at 1058 and 574 $cm^{-1}$ are due to asymmetric —S—N—S— stretching of LiTFSI and asymmetric $CF_3$ bending vibrations of LiTFSI salt, respectively, and the peak at 1630 $cm^{-1}$ is due to complexation between polymer backbone and LiTFSI salt. The retention of all the characteristic peaks of PVdF-HFP, even upon addition of LiTFSI, indicated the absence of any form of chemical reaction between the polymer and salt.

Comparing the spectra of PVdF-HFP before and after incorporation of nano-filler, the intensity of the broad band centered at 1070 $cm^{-1}$ clearly increased for $SiO_2$-incorporated PVdF-HFP using the C—F symmetric stretching band at 879 $cm^{-1}$ as referenced. This is due to the overlap of the band from the F—C—F symmetric stretching vibration at 1072 $cm^{-1}$ and the band from the Si—O—Si anti-symmetric stretching vibration at 1070 $cm^{-1}$, indicating the binding of Si—O— to the polymer.

In PVDF-HFP membranes incorporated with $TiO_2$, the $NH_2$ group usually observed at 1600 $cm^{-1}$ had shifted to the lower wave number around 1580 $cm^{-1}$. In addition, the peak at 1663 $cm^{-1}$ became prominent due to enhanced —C═O stretching due to interaction with $TiO_2$. This indicated the fact that a greater number of ions coordinate with —$NH_2$. The new interaction of salt-$TiO_2$ and $TiO_2$-polymer in the FTIR spectra of PVdF-HFP hybrid membranes can be expected to improve the ionic conductivity of the system on the fiber surface.

2.5 Mechanical Properties

Figure 4:
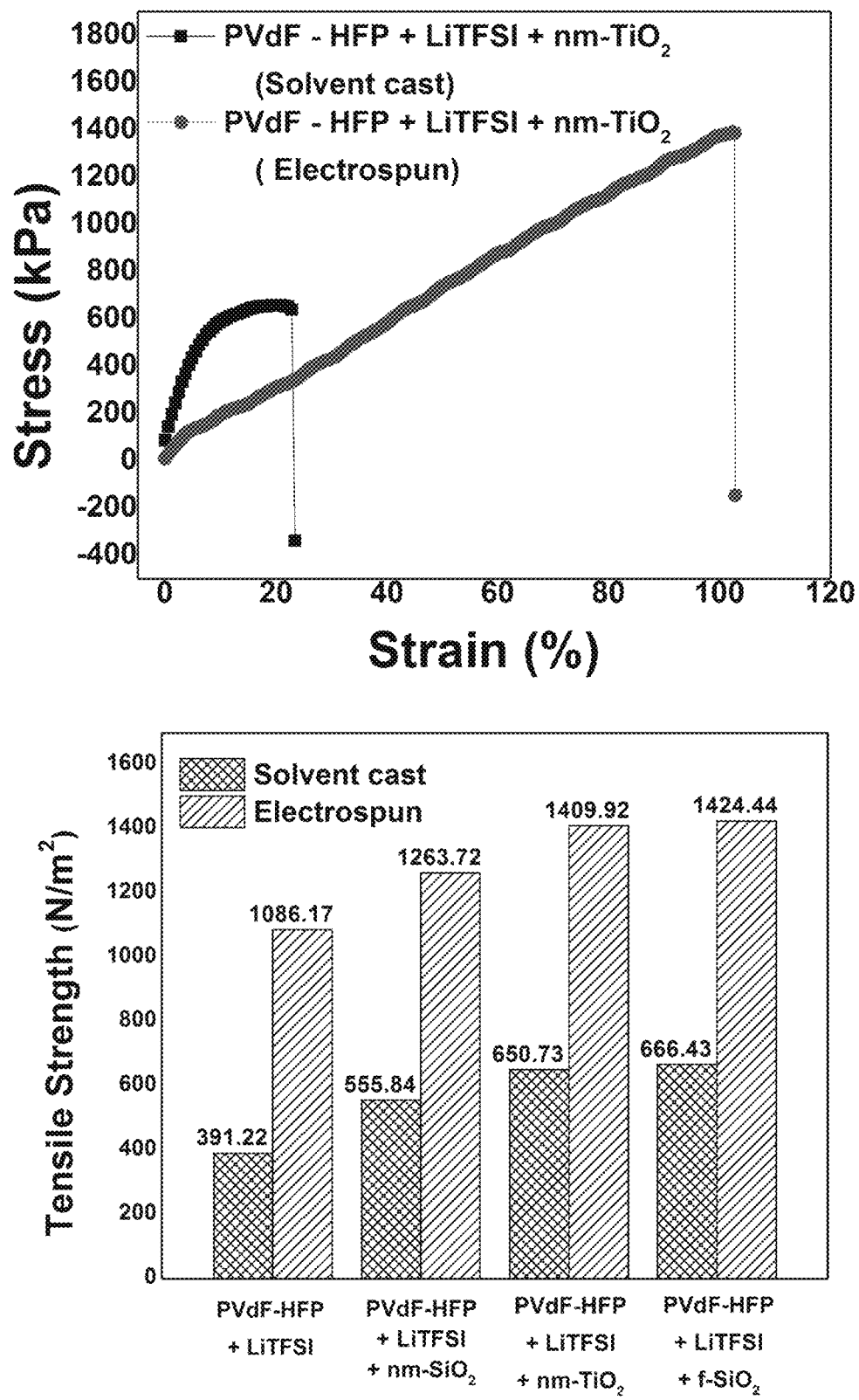
FIG. 4 includes plots showing a stress versus strain relationship for nm-$TiO_2$ incorporated membranes and comparison of tensile strength of various electrospun and solvent cast membranes, in accordance with certain embodiments of the invention.

The mechanical properties of the electrospun polymer membranes are important for effective application in batteries as separators. In electrospun membranes, mechanical properties are improved due to entanglement of singular fibers aided by the presence of nanoparticle fillers. The mechanical properties of the electrospun membranes were compared with that of solution cast membranes of the same composition to demonstrate the superior properties attained by employing the electrospinning method. The thickness of both electrospun and solvent cast membranes used for mechanical property measurements was maintained uniformly at 0.035±0.005 mm. The Strain vs Stress and Tensile Strength of the hybrid membranes characterized by tensile measurements is represented in FIG. 4. Both the solvent cast and electrospun samples exhibited a linear elastic behavior comparable to the results from similar systems reported in literature. The tensile strength of electrospun membranes was uniformly superior to that of solvent cast membranes due to the enhanced elastic nature of the electrospun membranes. For example, the tensile strength increased from 650.73 MPa for solvent cast PVdF-HFP+LiTFSI+nm-TiO$_2$ membrane to 1409.92 MPa for electrospun membranes, (FIG. 4a) confirming the effect of electrospinning on improving the tensile properties of the hybrid membranes.

2.6 Electrolyte Uptake

The relationship of electrolyte uptake of the nanofiber membranes with time, obtained by soaking the nanofiber membranes in the liquid electrolyte of 1.8 M LiTFSI and 0.1 M LiNO$_3$ in 1:1 vol. % dioxolane and dimethoxyethane for a period of 30 min, was evaluated. The electrolyte uptake was observed to stabilize within the initial 10 minutes of exposure to electrolyte for all the hybrid polymer membranes. The electrolyte uptake of f-SiO$_2$ membranes was ~219% which is about four times higher than the uptake of commercial polypropylene (PP) separator which was ~63%. As expected, the higher pore volume of the f-SiO$_2$ material (Table 1) resulted in the highest electrolyte uptake for the same (Table 2). The high retention ability and faster penetration of liquid electrolyte into the fibrous membranes were due to the unique pores generated from the interconnected fibers which in turn increased the ionic conductivity. PVDF-HFP+LiTSI membranes showed a very high uptake value ~550% due to uncontrolled swelling of membranes resulting from lack of mechanical integrity due to absence of filler particles.

TABLE 2

Electrolyte uptake studies on the polymer membranes

| Sample | Electrolyte uptake after 10 min (%) | Electrolyte uptake after 30 min (%) | Electrolyte uptake After 60 min (%) |
| --- | --- | --- | --- |
| PVdF - HFP + LiTFSI | 436.67 | 550 | 551.5 |
| PVdF-HFP + LiTFSI + mm-SiO$_2$ | 182.5 | 190.5 | 190.5 |
| PVdF-HFP + LiTFSI + f-SiO$_2$ | 207.5 | 219 | 220 |
| PVdF-HFP + LiTFSI + nm-TiO$_2$ | 253.5 | 266.5 | 270 |
| Commercial PP separator | 59.5 | 63 | 63 |

2.7. Ionic Conductivity Studies

Figure 5:
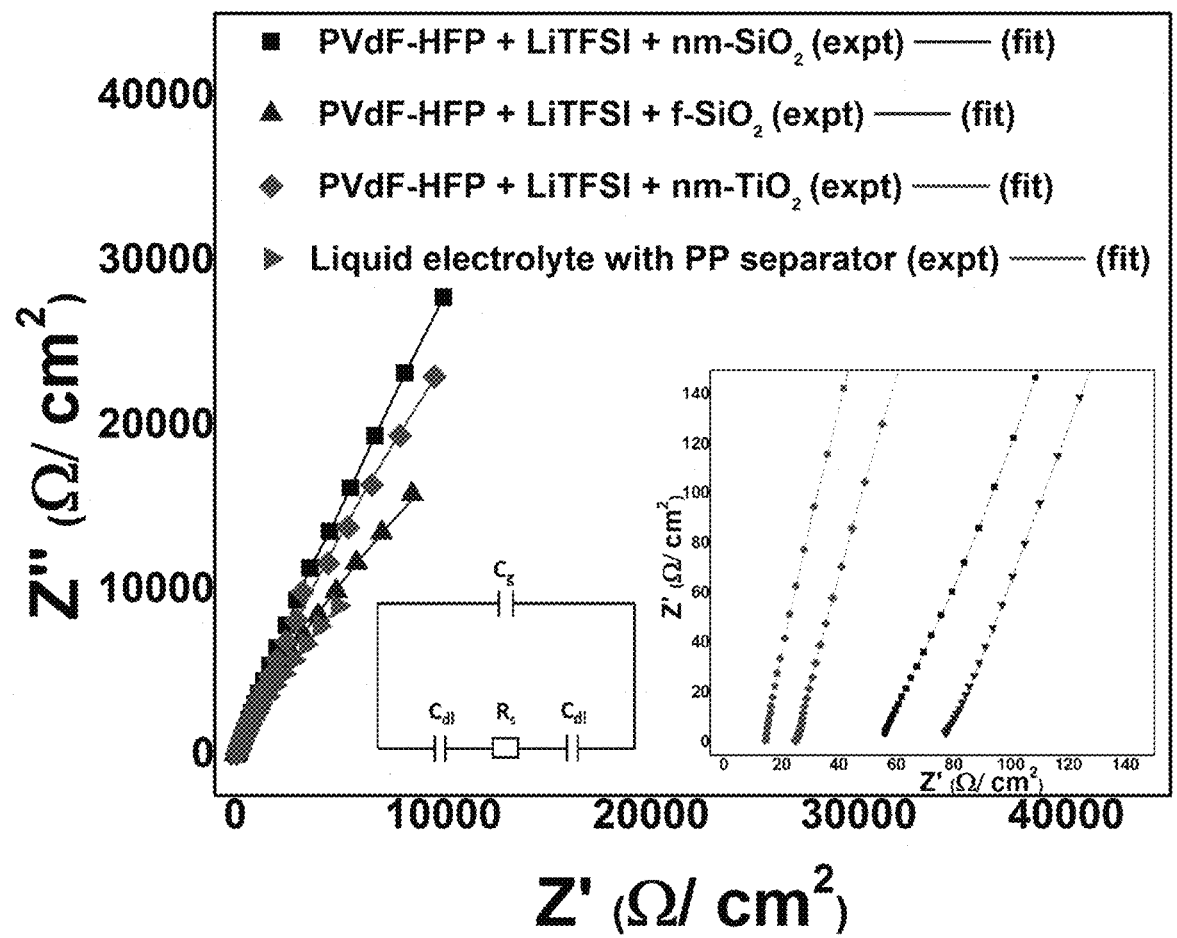
FIG. 5 is a fitted Nyquist plot for the polymer membranes along with the equivalent circuit, in accordance with certain embodiments of the invention.

For CPEs, their room temperature ionic conductivity should be close to liquid electrolytes to have acceptable electrochemical properties for application in Li-ion batteries. Electrochemical impedance spectroscopy (EIS) analysis of the CPEs was performed with stainless steel blocking electrodes on both sides. Nyquist plots of the EIS analysis of CPEs are shown in FIG. 5. Impedance plots were modelled to the general equivalent circuit where R$_s$ represents the electrolyte resistance, C$_{dl}$ represents the capacitive coupling between the ionic conduction in the electrolyte and the electronic conduction in the measuring circuit, and C$_g$ is the geometrical capacitance representing the capacitive effects of the cell hardware and of the electrical leads using Z-view 2.0. The electrolyte conductivity was calculated using R$_s$, thickness of the polymer membrane (t) and the surface are of the electrolyte sample, A, using the equation given below:

$$\sigma = \frac{t}{R_S A}$$

The room temperature conductivities of the polymer electrolytes were in the order of ~$10^{-3}$ S cm$^{-1}$ which is in line with several reports. From the conductivity value of the electrolyte, it was seen that there was an increase in ionic conductivity of the CPE systems in comparison with the liquid electrolyte based separator. This was due to enhanced electrolyte uptake due to the nanoporous structure of the electrospun membranes. The PVdF-HFP membranes with nm-SiO$_2$ fillers showed the highest room temperature conductivity of 9.4749×10$^{-3}$ S cm$^{-1}$. This was slightly unexpected due to the higher uptake observed for f-SiO$_2$, indicating that ionic conductivity in composite polymer electrolytes depended not only on the electrolyte uptake (Table 2) and pore volume (Table 1), but also on the nature of bonding of filler particles with the liquid electrolyte.

TABLE 3

Ionic conductivity of commercial electrolyte and various polymer membrane electrolytes

| Sample Composition | Conductivity (S/cm) |
| --- | --- |
| Commercial separator with liquid electrolyte | 1.283 · 10$^{-3}$ |
| PVdF-HFP + LiTFSI + nm-TiO$_2$ | 1.881 · 10$^{-3}$ |
| PVdF-HFP + LiTFSI + f-SiO$_2$ | 3.009 · 10$^{-3}$ |
| PVdF-HFP + LiTFSI + nm-SiO$_2$ | 9.4749 · 10$^{-3}$ |

2.8. Electrochemical Cycling Performance

Figure 6:
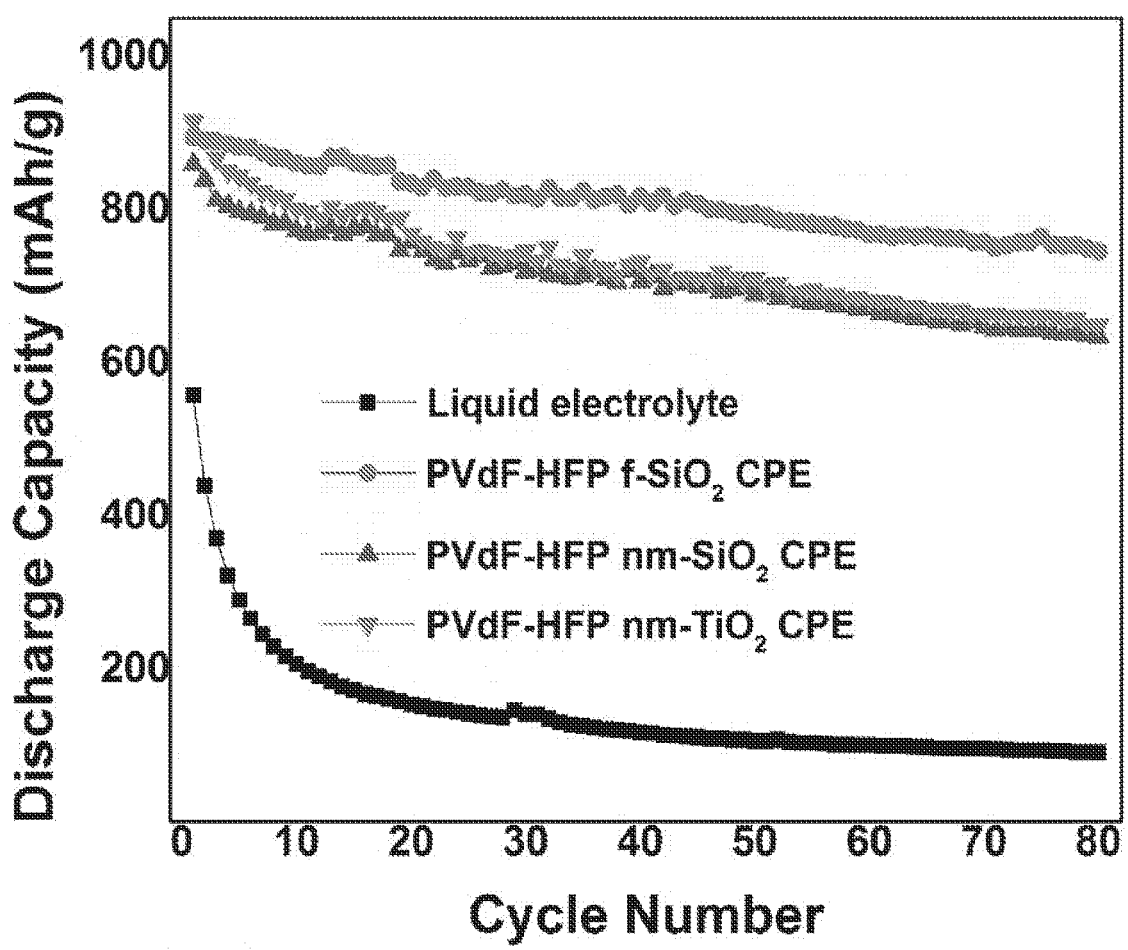
FIG. 6 is a plot that shows electrochemical charge-discharge performance of polymer membranes, in accordance with certain embodiments of the invention.

The electrochemical performance of the PVdF-HFP composite polymer electrolytes were studied by performing electrochemical charge-discharge cycling against commercial sulfur cathodes. The electrochemical cycling performance of the polymer electrolytes is shown in FIG. 6. The S-CPE electrodes and commercial sulfur electrodes were cycled at 0.1 C-rate with an average sulfur loading of ~2 g cm$^{-2}$ electrode area. The PVdF-HFP–f-SiO$_2$ hybrid polymer separator shows an initial capacity of 895 mAh g$^{-1}$ and a stable capacity of 845 mAh g$^{-1}$ after 100 cycles (fade rate 0.055%/cycle). On the other hand, the PVdF-HFP–nm-SiO$_2$ shows an initial discharge capacity of 860 mAh g$^{-1}$ which stabilizes at 734 mAh g$^{-1}$ after the 100 cycles cycle (0.146%/cycle). The PVdF-HFP nm-TiO$_2$ separators showed an initial capacity of 915 mAh g$^{-1}$ and stabilized at 749 mAh g$^{-1}$ (0.18%/cycle). However, commercial separator along with liquid electrolyte cycled opposite commercial sulfur cathode gave an initial capacity of 557 mAh g$^{-1}$ which quickly faded to 132 mAh g$^{-1}$ in less than 10 cycles. The enhanced electrochemical cycling performance of the f-SiO$_2$ incorporated CPE is attributed to the higher surface area and pore volume of the filler particles that facilitated the formation of an insulated layer of ceramic particles at the electrode surface that impede electrode reactions. This phenomenon was observed in the art when excessive amounts of the passive ceramic phase were introduced into the polymer matrix. This insulation layer, in addition to impeding surface reactions facilitates prevention of polysulfide dissolution in Li—S battery which supports the superior performance of the f-SiO$_2$ CPE over other fillers.

2.9. XPS Analysis of Separators Post Cycling

Figure 7:
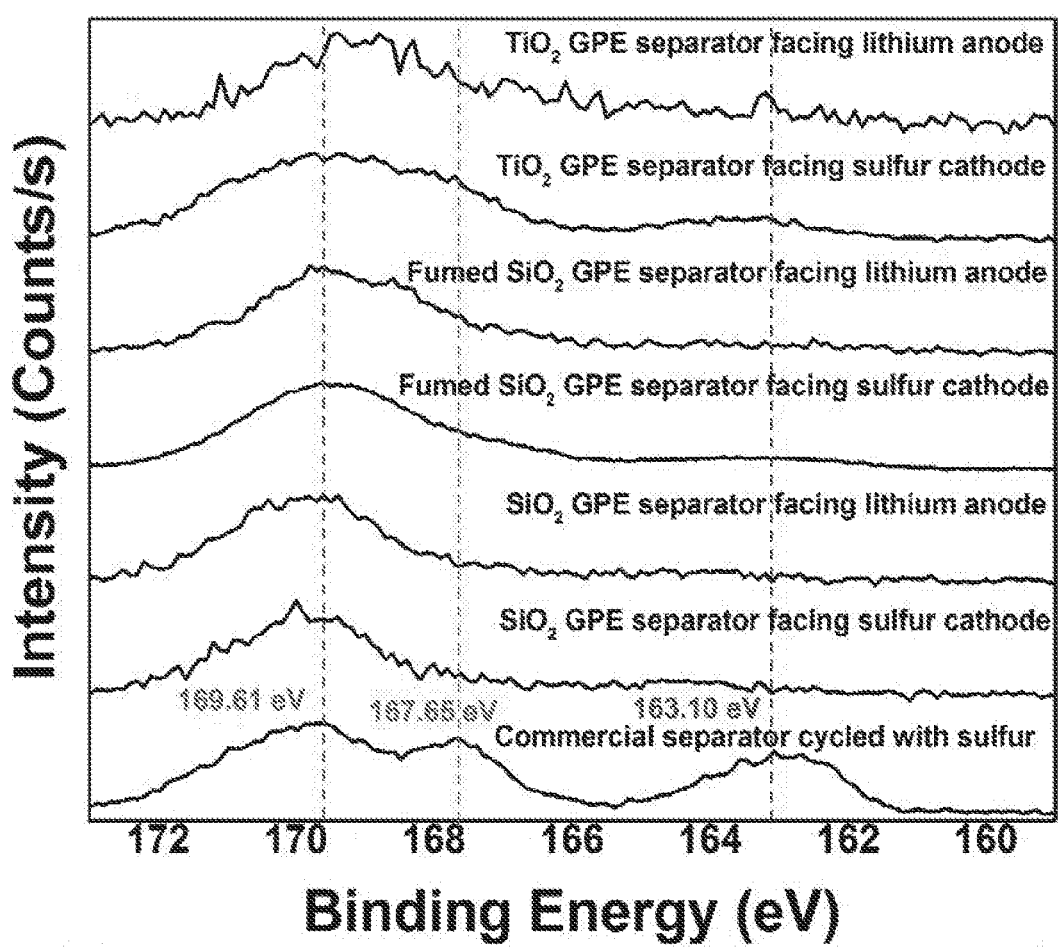
FIG. 7 is a plot that shows S2p spectrum of different separators before and after cycling, in accordance with certain embodiments of the invention.

To understand the origin of the cycling stability of the hybrid polymer membranes, XPS analysis was performed on the polymer electrolyte separators after 100 cycles. XPS was performed on both the side facing the sulfur cathode and the side facing the lithium anode. FIG. 7 represents the XPS of the polymer electrolyte membranes post cycling. The peak at 169.61 eV represents S2p peak corresponding to sulfur binding in LiTFSI, the peak at 167.65 eV and 163.10 eV corresponds to higher order polysulfide and Li$_2$S, respectively. Commercial separator and liquid electrolyte cycled with sulfur cathodes showed peaks corresponding to both higher and lower order polysulfide confirming polysulfide dissolution in liquid electrolyte system. However, these polysulfide peaks were absent in the polymer electrolyte membranes facing the lithium anode confirming the absence of polysulfide dissolution into the electrolyte. In contrast, the side of the fumed SiO$_2$ and TiO$_2$ incorporated polymer membrane facing the sulfur cathode showed very mild peak at 163.1 eV corresponding to Li$_2$S. This may be due to surface adsorbed Li$_2$S molecules and not dissolution of polysulfide.

2.10. FTIR Analysis Post Cycling

Figure 8:
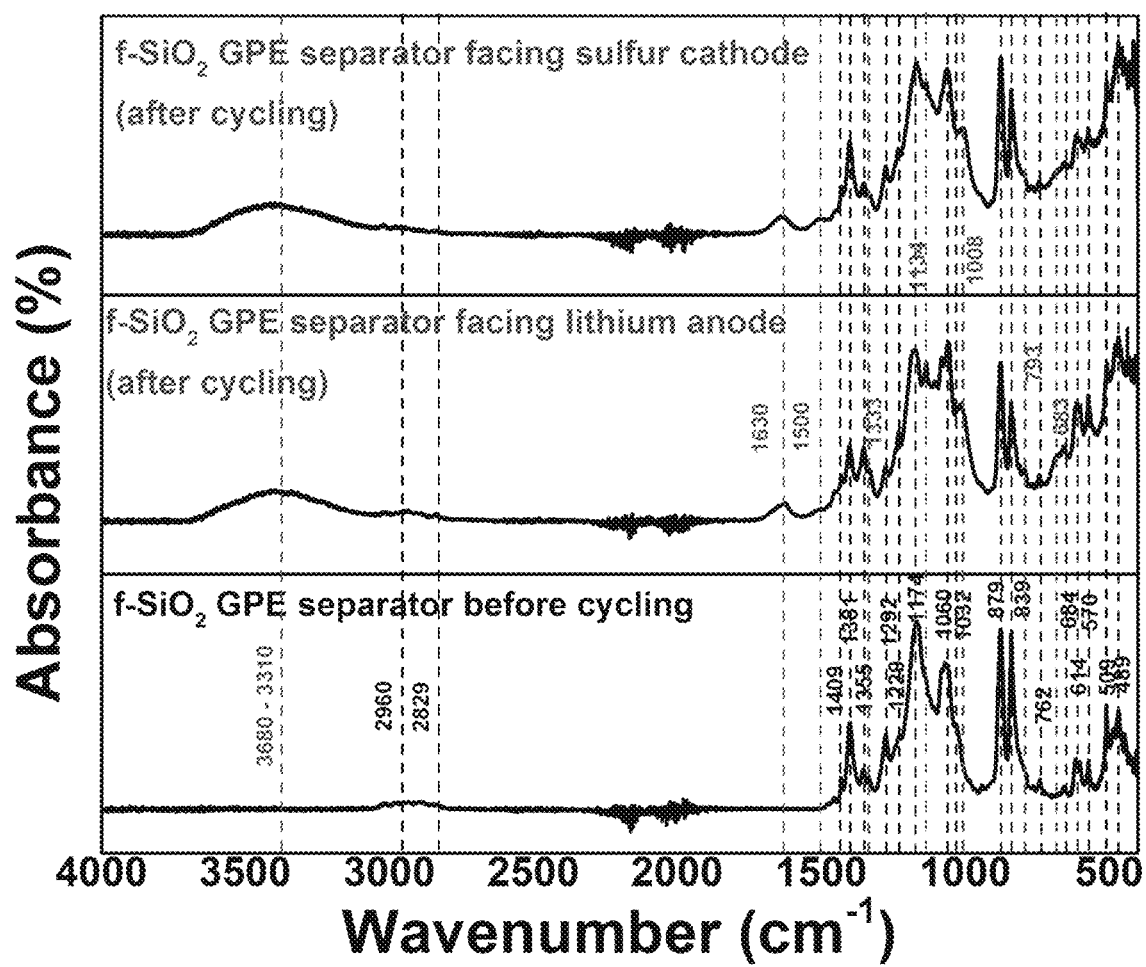
FIG. 8 is a plot that shows FTIR spectrum of a $SiO_2$ polymer electrolyte membrane before and after 100 cycles (side exposed to lithium anode and sulfur cathode), in accordance with certain embodiments of the invention.

Structural and chemical stability of the polymer membranes are important parameters in determining the long-time performance of polymer electrolytes. FTIR analysis was performed on the membranes after cycling to understand the change in chemical nature after cycling. The FTIR spectrum of PVdF-HFP+LiTFSI+SiO$_2$ separator (activated by soaking in 1.8 M LiTFSI and 1 M LiNO3 in 1:1 vol. % dioxolane and dimethoxy ethane for 30 min) before and after 100 charge-discharge cycles is shown in FIG. 8. The side of the separator facing lithium anode and the one facing sulfur cathode were analyzed using FTIR.

The FTIR spectrum of PVdF-HFP+LiTFSI+SiO$_2$ membrane soaked in electrolyte showed peaks corresponding to PVdF-HFP. In addition, the peak at 1032 cm$^{-1}$ and 1070 cm$^{-1}$ corresponded to the introduction of SO$_3^-$ group and overlap of F—C—F symmetric stretching vibrations and Si—O—Si asymmetric stretching vibrations resulting from LiTFSI and SiO$_2$, respectively. In addition, the polymer membranes prior to cycling showed peaks at 509, 570, 684, 762, 1229, 1355, 2829 and 2960 corresponding to out of plane —C—C— bending of the ring structure of dioxolane, symmetric deformation mode of —CF$_3$ group from interaction with dioxolane, —N—H bending vibrations from the imide group of LiTFSI, —C=O vibrations (ester), —C—N— stretching vibration, —CH$_3$ vibration from dimethoxyethane, —CH$_2$ symmetric stretching vibrations and —C—H stretching vibrations, respectively.

After 100 charge-discharge cycles, both sides of the polymer membrane showed almost the same pattern with peaks at 3680-3130 cm$^{-1}$ indicating the presence of exchangeable protons, from amide group of LITFSI. The peaks at 1630 and 1500 cm$^{-1}$ corresponded to —C=O bond from carbonyl group of dimethoxyethane. The band around 1333 cm$^{-1}$ corresponded to the —C—H ring bending vibrations of dioxolane ring. The peak at 1134 cm$^{-1}$ corresponded to stretching vibrations of carbonate group. The peaks at 1008, 793, 683 cm$^{-1}$ corresponded to —Si—O stretching vibrations, —SO$_3$ group from LiTFSI and Si—O—Si stretching vibration modes, respectively. The absence of anomalous peaks confirmed the chemical stability of the polymer membranes even after prolonged cycling. The chemical stability of the CPEs suggested their potential to replace PP separators in commercial sulfur batteries.

2.11. Lithium Symmetric Cell Performance

Figure 9:
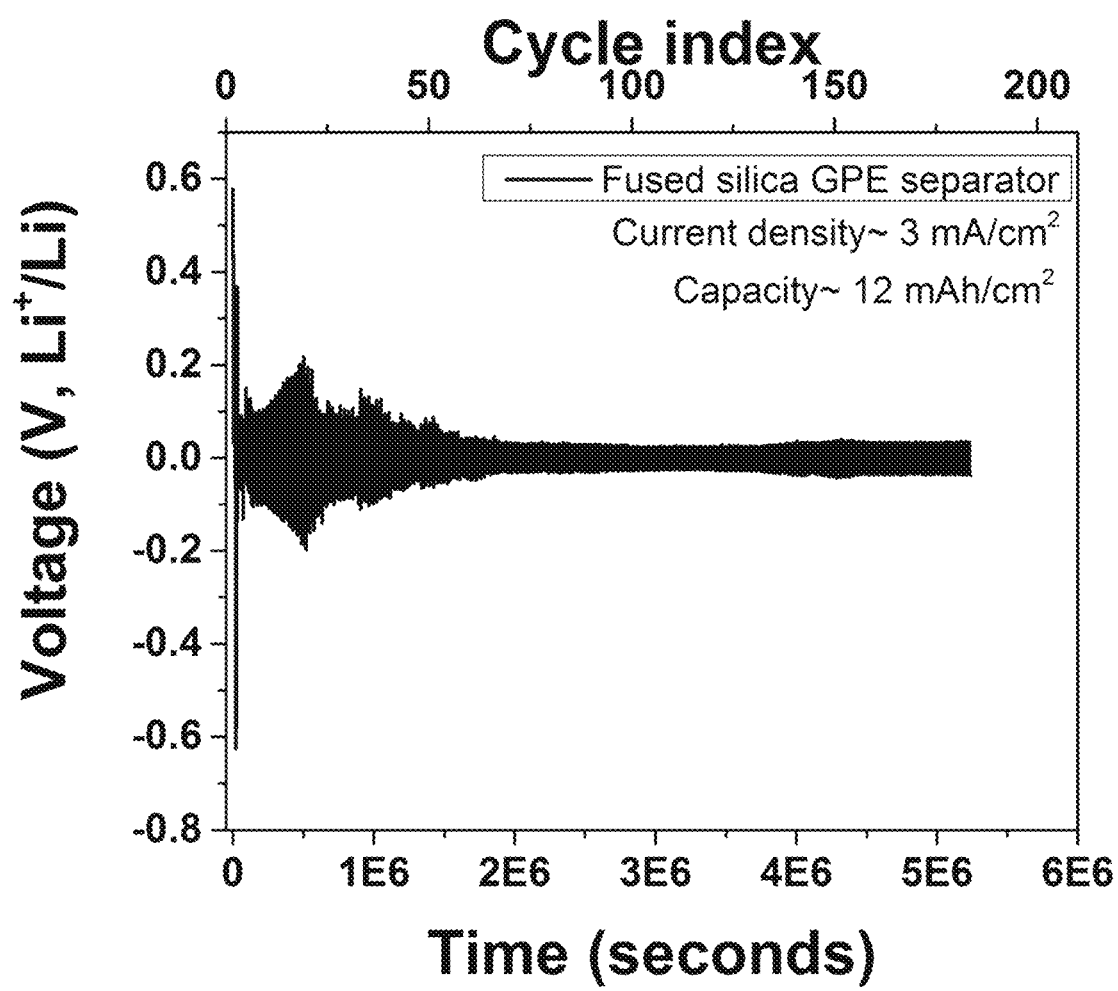
FIG. 9 shows stable cycling behavior demonstrated in lithium symmetric-cells using f-$SiO_2$ separators, in accordance with certain embodiments of the invention.

Lithium-lithium symmetric cells were prepared using f-SiO$_2$ containing PVdF-HFP GPEs as the separator. In order to demonstrate that the superior mechanical properties observed in FIG. 4 and the superior ionic conductivity observed in Table 3 contribute to the superior lithium-metal anode performance, testing was performed by plating and deplating a constant amount of lithium at a high current density of −3 mA/cm$^2$ (which is known to result in dendritic failure in commercial separator based lithium metal anode cells). Lithium plating-deplating is known to cause an increase in overpotential during cycling as a result of dendritic structure formation and a resulting formation-reformation of solid-electrolyte interphase (SEI). Control cells using liquid electrolyte failed during initial cycling as a result of rapid increase in overpotential. In contrast, f-SiO$_2$ based cells demonstrate very good stability over >150 cycles as seen in FIG. 9. The superior mechanical properties yielded by the fine nanoparticles in the f-SiO$_2$ separator result in this unique performance demonstrating that such CPEs are suitable not only to address polysulfide dissolution but to address as well dendritic growth in lithium metal anode based Li—S batteries.

3.1. Ionic Conductivity Studies (ZSM Nanofiller CPEs)

Figure 10:
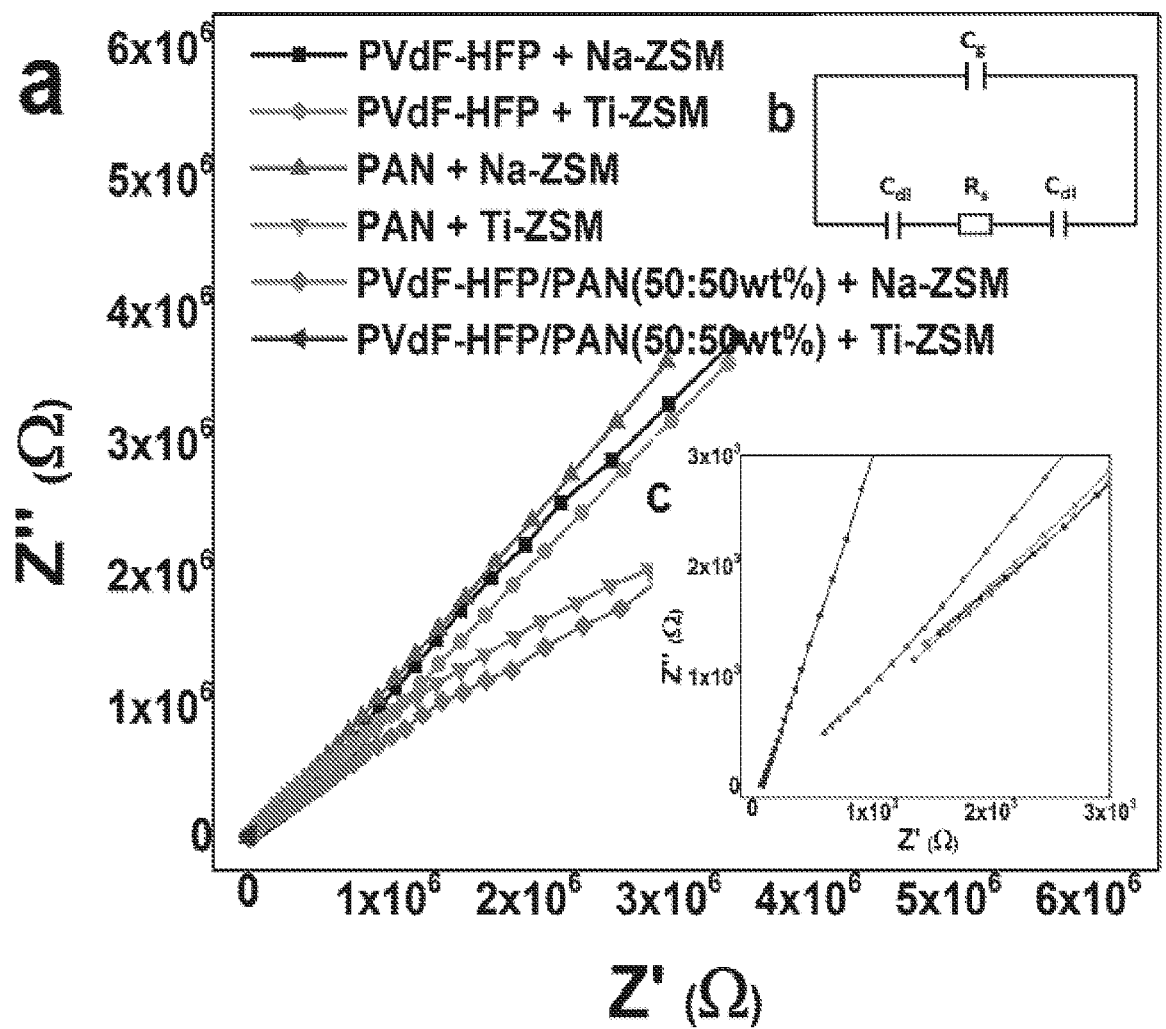
FIG. 10 shows a) fitted Nyquist plot of the polymer membranes, b) enlarged Nyquist plot and c) equivalent circuit used to fit the Nyquist plots, in accordance with certain embodiments of the invention.

For CPEs, their room temperature ionic conductivity should be close to liquid electrolytes to have acceptable electrochemical properties. EIS analysis of the CPEs was performed with stainless steel blocking electrodes on both sides. Nyquist plots of the EIS analysis of the CPEs are shown in FIG. 10 (a,c). The impedance plots were modeled to the general equivalent circuit using Z-view 2.0, where R$_s$ represents the electrolyte resistance, C$_{dl}$ represents the capacitive coupling between the ionic conduction in the electrolyte and the electronic conduction in the measuring circuit. Additionally, C$_g$ is the geometrical capacitance representing the capacitive effects of the cell hardware and of the electrical leads. The electrolyte conductivity was thus, calculated using R$_s$, thickness of the polymer membrane (t) and the surface are of the electrolyte sample, A using the equation given below:

$$\sigma = \frac{t}{R_S A}$$

The room temperature conductivities of the polymer electrolytes were about ~10$^{-3}$; S cm$^{-1}$. From the conductivity value of the electrolyte, it was seen that there was an increase in ionic conductivity of the CPE systems in comparison with the liquid electrolyte-based separator. This was due to the enhanced electrolyte uptake, due to the nanoporous structure of the electrospun membranes. PVdF-HFP/PAN (50:50 wt %) membranes with Ti-ZSM fillers showed the highest room temperature conductivity of 4.829×10$^{-3}$ S cm$^{-1}$ (Table 4).

TABLE 4

Ionic conductivity of commercial electrolyte and various
polymer membrane electrolytes (each data represents
an average of three independent tests run on three
different samples under identical conditions)

| LIC Composition | Ionic Conductivity (mS cm$^{-1}$) |
|---|---|
| PVdF-HFP + Na-ZSM | 1.351 |
| PVdF-HFP + Ti-ZSM | 2.253 |
| PAN + Na-ZSM | 2.654 |
| PAN + Ti-ZSM | 2.997 |
| PVdF-HFP/PAN (50:50 wt %) + Na-ZSM | 2.091 |
| PVdF-HFP/PAN (50:50 wt %) + Ti-ZSM | 4.839 |
| Liquid Electrolyte | 4.283 |

3.2 Mechanical Property Data of the CPEs

Figure 11:
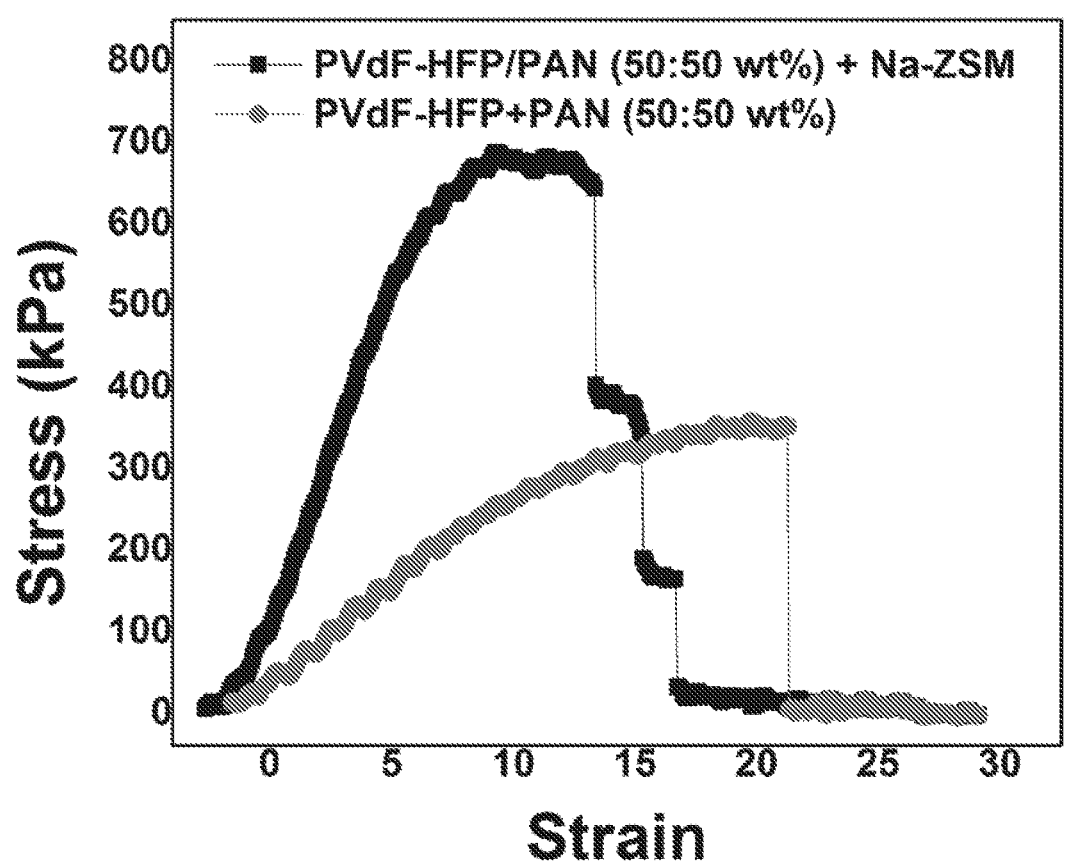
FIG. 11 is a plot that shows a stress versus strain relationship for nm-$TiO_2$ incorporated membranes, in accordance with certain embodiments of the invention.

The mechanical properties of the electrospun polymer membranes are important for effective application in batteries as separators. In the electrospun membranes, mechanical properties are expected to be further improved due to entanglement of the singular fibers aided by the presence of nanoparticle fillers. The mechanical properties of the electrospun membranes were compared with that of solution cast membranes of the same composition to demonstrate the superior properties attained by the electrospinning method. The thickness of both electrospun and solvent cast membranes used for mechanical property measurements was maintained uniformly at 0.035±0.005 mm. The stress versus strain of the hybrid membranes characterized by tensile measurements are represented in FIG. 11. Both the solvent cast and electrospun samples exhibited a linear elastic behavior comparable to results from similar known systems. The failure of the electrospun PVdF-HFP/PAN (50:50 wt %)+Na-ZSM membranes was much prolonged, as seen in FIG. 11, due to the enhanced mechanical property incorporated by the Na-ZSM.

3.3 Electrochemical Cycling Performance of the CPEs

Figure 12:
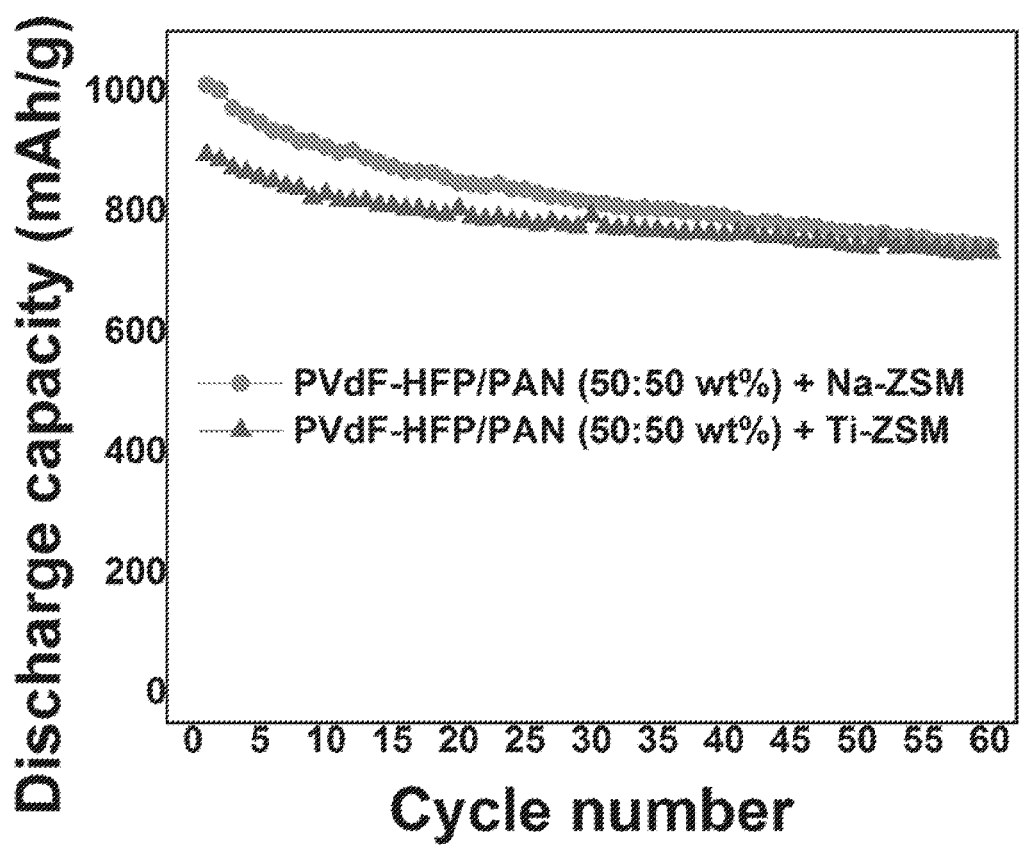
FIG. 12 is a plot that shows electrochemical cycle performance of different polymer membranes, in accordance with certain embodiments of the invention.

The electrochemical performance of the PVdF-HFP composite polymer electrolytes were assessed by performing electrochemical charge-discharge cycling against commercial sulfur cathodes. The electrochemical cycling performance and coulombic efficiencies of the polymer electrolytes are shown in FIG. 12. The PVdF-HFP/PAN (50:50 wt %)+Na-ZSM hybrid polymer separator showed an initial capacity of 1010 mAh g$^{-1}$ and a stable capacity of 842 mAh g$^{-1}$ after 60 cycles. The PVdF-HFP/PAN (50:50 wt %)+Ti-ZSM showed an initial discharge capacity of 894 mAh g$^{-1}$ which stabilized at 820 mAh g$^{-1}$ after 60 cycles.

CONCLUSIONS

The f-SiO$_2$, nm-SiO$_2$ and nm-TiO$_2$ incorporated novel electrospun PVdF-HFP CPEs were tested as electrolytes in a Li—S battery. The f-SiO$_2$ CPE exhibited an initial discharge capacity of 895 mAh g$^{-1}$ and very low fade rate of 0.055%/cycle when cycled for over 100 cycles at 0.1 C rate against commercial sulfur cathode, which is one of the best performances that has been reported in the literature to date. The electrospinning technique was shown to improve the mechanical properties of the CPEs, which in turn helped suppress dendrite formation on the lithium anode. The nano-filler-incorporated CPEs exhibited excellent room temperature ionic conductivity comparable to that of liquid electrolytes. The CPEs also exhibited excellent chemical stability upon cycling for over 100 cycles confirmed using FTIR analysis. The high surface area f-SiO$_2$ filler is advantageous in preventing polysulfide dissolution by forming an insulating film over the cathode. This was confirmed using XPS analysis which indicated the absence of polysulfide species on the surface of cycled separators. The results are of significant value to demonstrate the potential of preventing polysulfide dissolution and dendrite formation using CPE separators.

It should be understood that the embodiments described herein and the examples above are for illustrative purposes only and that various modifications or changes in light thereof will be suggested to persons skilled in the art and are to be included within the spirit and purview of this application.

The invention claimed is:

1. A lithium ion conducting composite polymer electrolyte separator, comprising:
    an activated nanofiber mat, comprising:
        a nanofiber mat, comprising:
            multiple layers of electrospun nanofibers, comprising:
                a polymer having one or more polar halogen groups;
                a lithium-containing solid or liquid electrolyte; and
                from 10 to 20 weight percent of nanoparticle filler based on total weight of the lithium ion conducting composite polymer electrolyte separator, comprising fumed silica, nanoparticle silicon dioxide, and one or more of nanoparticle titanium dioxide, nanoparticle vanadium oxide, and nanoparticle boron trioxide; and
        an activation solution comprising a liquid electrolyte, soaked in the nanofiber mat.

2. The composite polymer electrolyte separator of claim 1, wherein the polymer comprises poly(vinylidene fluoride-co-hexafluoro propylene).

3. The composite polymer electrolyte separator of claim 1, wherein the electrolyte comprises bis(trifluoromethane) sulfonimide lithium salt.

4. The composite polymer electrolyte separator of claim 1, wherein the lithium-containing solid or liquid electrolyte comprises an element selected from the group consisting of magnesium, sodium and mixtures and combinations thereof.

5. The composite polymer electrolyte separator of claim 1, wherein the nanoparticle filler comprises nanoparticles selected from the group consisting of transition metal, metal oxide and metal non-oxide selected from Group III, Group IV and Group V of the Periodic Table.

6. The composite polymer electrolyte separator of claim 5, wherein the metal non-oxide is selected from the group consisting of nitride, carbide, boride, sulfide, selenide, telluride, phosphide, antimonide, arsenide, bismuthide, and mixtures and combinations thereof.

7. The composite polymer electrolyte separator of claim 1, wherein the nanoparticle filler comprises a dopant to form a doped nanoparticle filler.

8. The composite polymer electrolyte separator of claim 7, wherein the doped nanoparticle filler is selected from the group consisting of Al$_2$O$_3$, B$_2$O$_3$, GeO$_2$, SnO$_2$, Bi$_2$O$_3$, Sb$_2$O$_3$ and mixtures thereof.

9. The composite polymer electrolyte separator of claim 1, wherein the composite is a membrane.

10. The composite polymer electrolyte separator of claim 1, wherein the electrospun nanofibers have a diameter from 1-5 μm.

11. A method of preparing a lithium ion conducting composite polymer electrolyte separator, comprising:

preparing a solution, comprising:
- a polymer having one or more polar halogen groups;
- a lithium-containing solid or liquid electrolyte; and
- from 10 to 20 weight percent of nanoparticle filler based on total weight of the lithium ion conducting composite polymer electrolyte separator, comprising fumed silica, nanoparticle silicon dioxide, and one or more of nanoparticle titanium dioxide, nanoparticle vanadium oxide, and nanoparticle boron trioxide;

electrospinning the solution;

forming electrospun nanofibers;

forming a nanofiber mat comprising multiple layers of the electrospun nanofibers; and activating the nanofiber mat comprising soaking the nanofiber mat in an activation solution comprising a liquid electrolyte.

\* \* \* \* \*